United States Patent

Wells

[11] Patent Number: 5,845,975
[45] Date of Patent: Dec. 8, 1998

[54] SEQUENTIAL SELECTIVE OPERATION OF AIRCRAFT BRAKES

[75] Inventor: Trevor Charles Wells, Leamington Spa, England

[73] Assignee: Dunlop Limited, London, United Kingdom

[21] Appl. No.: 873,891

[22] Filed: Jun. 12, 1997

Related U.S. Application Data

[63] Continuation of Ser. No. 206,178, Mar. 7, 1994, abandoned.

[30] Foreign Application Priority Data

| Mar. 6, 1993 | [GB] | United Kingdom | ................... 9304595 |
| Mar. 6, 1993 | [GB] | United Kingdom | ................... 9304596 |

[51] Int. Cl.[6] .................................................. B64C 25/68
[52] U.S. Cl. ...................... 303/126; 244/110 A; 188/382
[58] Field of Search ........................... 188/181 R, 181 T, 188/264 R, 106 P, 382; 244/110 A, 111, 110 D, 110 R; 303/2, 7, 9.61, 9.62, 13–16, 20, 126

[56] References Cited

U.S. PATENT DOCUMENTS

| 4,007,970 | 2/1977 | Romero ...................................... 303/93 |
| 4,008,868 | 2/1977 | Berg ........................................ 244/111 |
| 4,404,633 | 9/1983 | Goicoechea ........................... 303/93 X |
| 4,410,153 | 10/1983 | Romero .................................... 244/111 |
| 4,430,715 | 2/1984 | Gentet et al. ........................ 244/111 X |
| 4,591,213 | 5/1986 | Rapoport .............................. 244/111 X |
| 4,923,056 | 5/1990 | Nedelk ................................. 244/111 X |
| 4,971,179 | 11/1990 | Gebhardt et al. .......................... 188/33 |
| 4,986,610 | 1/1991 | Beck et al. ....................... 188/106 P X |
| 5,172,960 | 12/1992 | Chareire ................................. 303/100 |
| 5,217,282 | 6/1993 | Guichard ................................ 303/9.73 |
| 5,417,477 | 5/1995 | Lasbleis . |

FOREIGN PATENT DOCUMENTS

| 0247253 | 12/1987 | European Pat. Off. . |
| 0329373 | 8/1989 | European Pat. Off. . |
| 0384071 | 8/1990 | European Pat. Off. . |
| 0443213 | 8/1991 | European Pat. Off. . |
| 0499515 | 8/1992 | European Pat. Off. . |
| 2216209 | 10/1989 | United Kingdom . |

*Primary Examiner*—Peter M. Poon
*Attorney, Agent, or Firm*—Stevens, Davis, Miller & Mosher, L.L.P.

[57] ABSTRACT

In an aircraft braking system comprising a plurality of carbon brakes a brake control system is provided whereby the number and/or proportion of brakes that may be disabled at each stage of a flight spectrum (i.e. taxi-out, take-off, in-flight, landing, taxi-in or stationary on the ground) and also the number and/or proportion applicable during each stage is further adjusted in response to the specific conditions applicable to the aircraft status at any given time thereby to ensure that the overall safety of the aircraft is not hazarded. The operation of the brake control system may be controlled at least in part by an on-board brake control implementation device actuated by a remote, land-based signal. The brake control system providing for use of less than the total number of available brakes during the landing stage of the flight spectrum.

38 Claims, 4 Drawing Sheets

SEQUENTIAL SELECTIVE OPERATION OF AIRCRAFT BRAKES

This application is a continuation of application Ser. No. 08/206,178, filed Mar. 7, 1994 (abandoned).

BACKGROUND OF THE INVENTION

The present invention relates to an aircraft brake control system for the control of a plurality of carbon brakes and to an aircraft braking system comprising a plurality of carbon brakes operatively associated with said brake control system.

The ability to stop an aircraft both quickly and economically is of great importance and enormous amounts of kinetic energy have to be dissipated in order to bring a moving aircraft to rest, particularly in an RTO (refused or rejected take-off) situation. The aircraft velocity may be decreased and the kinetic energy thereby dissipated by drag forces, by application of the engine thrust reversers, and by application of the aircraft wheel brakes. The drag forces can be increased by deploying of airbrakes or speed brakes on the aircraft wings.

However, very high energy brake applications in a RTO situation are fortunately rare events and therefore play little, if any, part in determining overall brake operating economics.

It is now recognized that the rate of wear of carbon brake discs is not proportional to the energy dissipated during the time the brakes are applied, brake wear being disproportionately high when the energy input to the brake is low. Consequently, it is beneficial to apply only a restricted number of the available brakes when the required braking action is relatively low.

The concept of applying only limited numbers of brakes during taxiing operations but all the available brakes in a landing run has already been disclosed in GB 2216209B and U.S. Pat. No. 4,986,610. The concept has been described variously as brake disabling, selective operation or as taxi-brake select.

SUMMARY OF THE INVENTION

In accordance with one of its aspects the present invention provides an aircraft braking system comprising a plurality of carbon brakes, brake actuating means for actuating the brakes in response to an applied control signal and control means whereby operation of a pre-selected number of the brakes is inhibited if at least one control signal applied to the brake actuating means lies beyond a predetermined control signal threshold, the control means being operable to inhibit at least one of a plurality of brakes in relation to the braking level requirement of the aircraft, said control means being operable to limit the number and/or proportion of brakes that may be disabled at each stage of a flight spectrum including taxi-out, take-off, landing and taxi-in and being operable also such that the number and/or proportion of disabled brakes is a function of monitored conditions applicable to the aircraft status at any given time thereby to ensure that the overall safety of the aircraft is not hazarded.

In accordance with another of its aspects the invention provides that operation of an aircraft brake control system is controlled at least in part by an on-board brake control implementation means actuated by a remote land-based signalling means.

Said system may be used to activate the selective brake operating means in response to signalling means located at the junction between an aircraft runway and its ancillary taxiways. It is envisaged to "ring-fence" or likewise define the boundary of part of the runway and arrange that the manner of operation of the selective braking means is a function of whether the aircraft is operating within the designated runway area.

At an airport having more than one runway, a further, auxiliary control system may be provided to select from a limited number of a plurality of remote signalling means. Said selection (or inhibition) may be a function of whether (or not) a given runway is designated as being in operational use.

Said remote signalling means may be used in combination with other selective brake operation means.

The control system may comprise an on-board data bank which stores information concerning the conditions relating to those airports to which the aircraft flies frequently and the selective braking control system may receive input from such a data bank. Thus, in use, before an aircraft lands the minimum proportion of the brakes to be operated may be preset to take account of fixed parameters, e.g. runway length, airport altitude, and variable parameters such as ambient temperature, runway status (dry/wet/icy).

The invention further provides a method of operating the brakes of a multi-wheel aircraft during taxiing thereof where the aircraft has a total of N brakes and wherein each of the brakes $n_1, n_2 \ldots n_x$ may be selectively operated in the case of $N > n_x > n_2 > n_1$, said method comprising:

operating the aircraft with $n_1$ brakes during taxiing, detecting a condition which at least potentially requires additional force, applying additional braking force progressively or incrementally to increase from $n_1$ to $n_2$, detecting whether a condition requiring additional braking force continues to exist, and increasing the braking force progressively or incrementally from $n_2$ to $n_x$ while said condition requiring additional braking force continues to exist.

This sequence of additional brakes is one type of cascade operating system. In general, cascade operation systems can be used either to increase or decrease the number of brakes always provided that the safety of the aircraft operation is always fully maintained.

The present invention provides also a method of controlling an aircraft braking system comprising a plurality of carbon disc brakes, or so-called "carbon-carbon" composite brakes comprising carbon discs containing a carbon fiber reinforcing material, said method comprising providing brake actuating means for actuating the brakes in response to an applied control signal, providing control means for inhibiting any one of a plurality of different numbers of brakes and arranging the control means to be responsive to the braking level requirement of the aircraft to inhibit a number of brakes selected as a function of said braking level requirement.

A brake control system of the invention may be programmed to determine the minimum number $n_1$ of brakes that are required to control the aircraft in a safe manner at a particular airport runway. If $n_1$ brakes operate initially out of a total N brakes fitted to the aircraft, then after receipt of an input signal for example denoting anti-skid activity of one or more of said $n_1$ brakes the number of brakes which are selectively operated may be increased to $n_2$ where $N > n_2 > n_1$ provided that the aircraft can continue to operate in a completely safe manner. Similarly, if anti-skid activity then continues to occur in one or more of the $n_1$ brakes, or is initiated in the additional $n_2-n_1$ brakes which are further selectively operated, then the number of selectively operated brakes may be increased to $n_3$ where $N>n_3>n_2>n_1$. The number of selectively operated brakes may be increased incrementally from $n_1$ to $n_x$ where $N>n_x>n_1$ and $n_1$ of the $n_x$ brakes shall operate without anti-skid activity at any one time.

These drawings are given by way of example and not of limitation and will be discussed later in greater detail.

DETAILED DESCRIPTION OF THE INVENTION

Consideration is now given, by way of example, to the case of an aircraft with 16 brakes where initially 4 brakes are sufficient to provide the necessary braking during a taxi-stop or taxi-snub (i.e. deceleration during taxiing), but anti-skid activity then initiates. If the selective operation of 8 brakes would still enable the aircraft to be safely controlled, then it may be arranged advantageously that only the 8 brakes rather than the full 16 brakes are applied, as selective operation of the said 8 brakes would effectively reduce the overall brake wear on the aircraft and give a substantial life saving when the aforedescribed type of cascade operating system is used, rather than the conventional arrangement in which the selective operation sequence is "cancelled" and all sixteen brakes are immediately applied upon onset of anti-skid or some other occurrence.

In a further embodiment when external input signals indicative of pilot demand, anti-skid control activity, or the proximity of other vehicles or objects lie outside a first range of acceptable instantaneous values it may be provided that it is still not always necessary to apply all brakes simultaneously.

The present invention seeks to optimize the benefits of the selective operation/brake disabling procedure while ensuring that the airworthiness status and the overall safety of the aircraft are not hazarded. For that purpose the present invention provides that limitations are placed on the number and/or proportion of brakes that may be disabled not only at each stage of the complete flight spectrum (i.e. taxiing-out, take-off, in flight, landing, taxiing-in or stationary on the ground) but also that said number and/or proportion applicable during each stage shall be further adjusted in response to the specific conditions applicable to the aircraft status at any given time.

The brake control system which provides a selective operation facility may utilize closed-loop feedback systems to regulate the brake actuation procedures.

Figure 1:
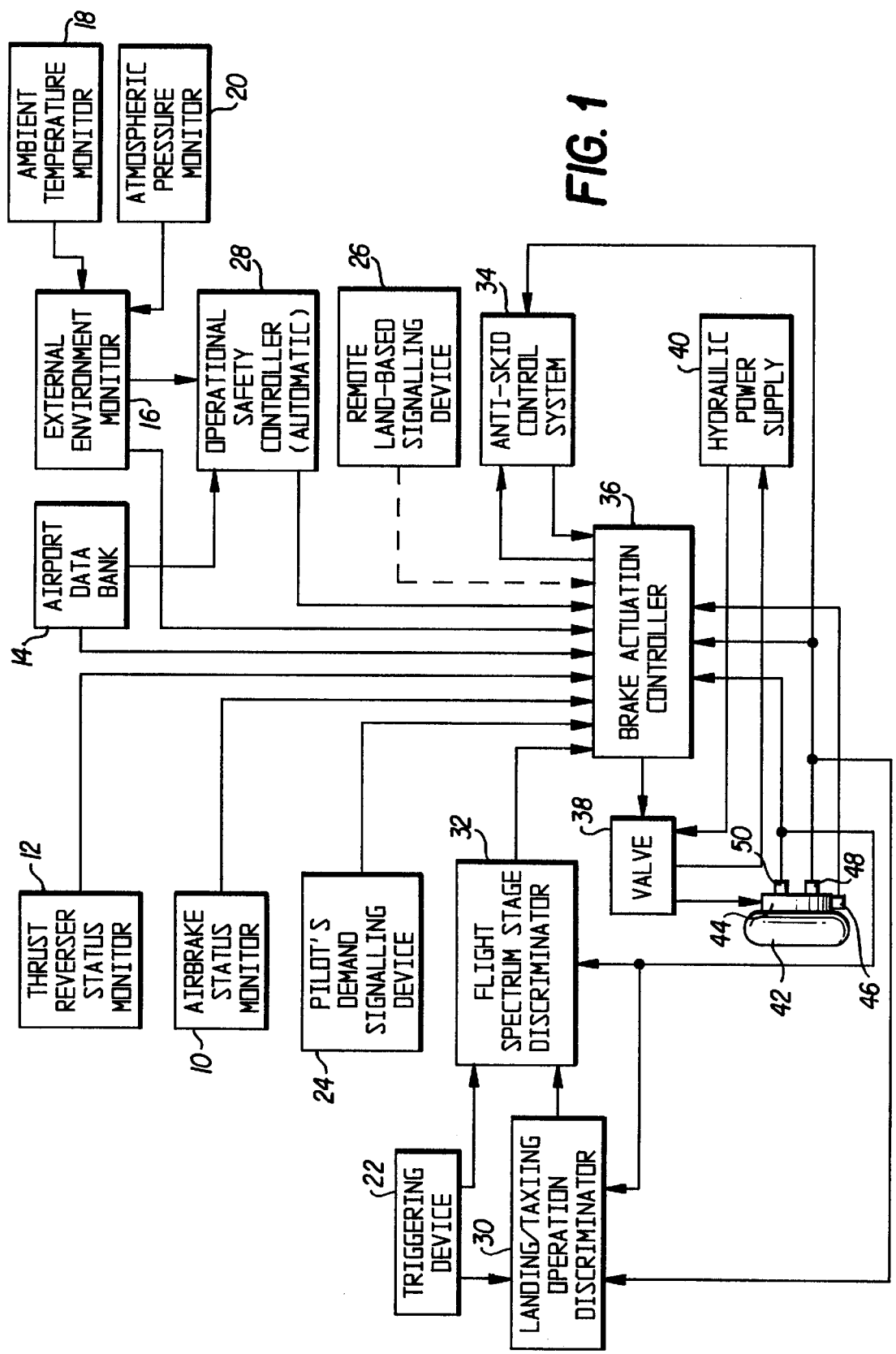
FIG. 1 is a block schematic illustration of a n aircraft braking system in accordance with the invention in which, for simplicity, only one of the plurality of wheel and brakes is shown.
Figure 7:
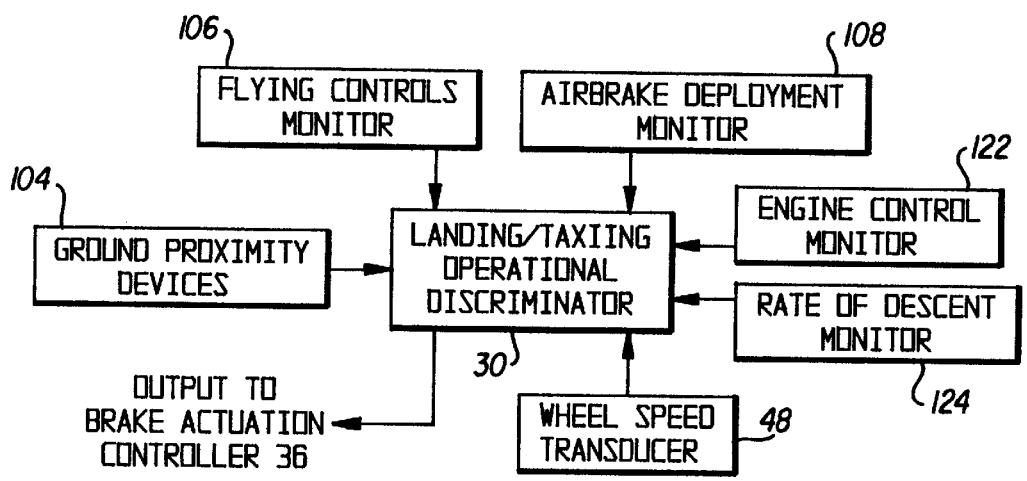

As depicted in FIGS. 1 and 7, the brake control system may be interlinked with an airbrake deployment system control and an engine thrust reverse control so that full braking action is provided at all times when such other features are operational.

In setting the specification for an aircraft a constructor thereof must design for a worst case scenario.

The constructor must consider the likely increase in maximum aircraft take-off (TO) weight that may occur during his program as he introduces new variants within his model range. For a maximum TO weight increase of 10%, which is typical, the brake energy requirement will increase by 20% as a higher TO velocity will be required in order to produce the increased lift required for take-off.

The constructor needs also to specify brakes capable of use under extreme conditions e.g. corresponding to those appertaining to airports at high altitude in hot locations e.g. Mexico City or Denver during the summer.

The constructor needs to ensure also that the aircraft has the capability to land and take off at airports with relatively short runways.

Consequently there will be many instances where the actual landing conditions are far less onerous than the specification requirement. Furthermore the landing requirement is always far less onerous than the rejected take off requirement as by the end of the flight the bulk of the aircraft fuel will have been consumed.

Operation of the selective brake control system may be conditional on other, e.g. flight, parameters being normal. Thus the system may be inhibited at least in part if for example the approach rate of aircraft or point of landing is not within prescribed boundaries. There may be one boundary outside which there is complete inhibition, i.e. inhibition of the brake selection means thereby to result in full braking. There may be another boundary which results in only partial inhibition, i.e. a greater number of brakes are brought into operation than would normally be the case, but not all of the brakes are brought into operation. The system of the present invention may be operable to detect parameters prior to touch down and preselect or preestablish whether or not flight and related parameters lie within one or more prescribed boundaries.

A further object of the present invention is to reduce the overall wear during the landing run by operating at least one less than all the available brakes during the landing run provided that this is consistent with maintaining operational safety and such means will be considered further.

Previously it has been taught either (1) that above an upper velocity threshold representing the maximum taxiing velocity all brakes shall be operative in order to ensure operational safety or (2) that selective braking can continue above the operational threshold without the benefit of additional safety features as in European Patent Publication EP 0443213 A2 or (3) the only additional safety feature being provided by a second manual override system as in U.S. Pat. No. 5,172,960.

Figure 6:
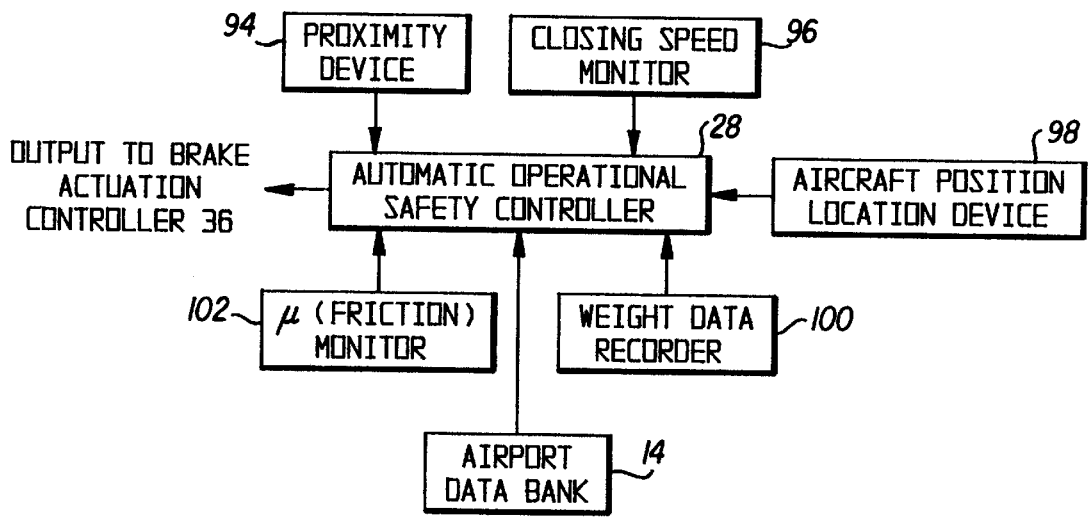
FIG. 6 is a block schematic illustration of an automatic operational safety controller in accordance with the invention; and, FIG. 7 is a block schematic illustration of a landing/taxi operation discriminator.

The present invention provides in another of its aspects, e.g. in FIGS. 6 and 7, automatic means for activating additional brakes in a selective braking operation in response to transducer signals indicative (1) of at least one of the following parameters of the aircraft external environment:

a) proximity of the other vehicles b) relative velocity of other vehicles or objects in relation to the subject aircraft c) the tire-ground friction coefficients d) the location of the aircraft within the airport confines e) any other significant operating considerations f) external signalling means (2) the interaction between at least one said signal indicative of the external environment and a transducer signal indicative of at least one characteristic of the aircraft such as:

a) aircraft velocity b) wheel velocity c) aircraft all up weight d) degree of wear of brake disc assembly These selections provide a sophisticated override system which may ensure that a cascade operating system only operates in a manner which is compatible with maintaining the overall safety of the aircraft at all times.

Thus a variable number of brakes may be selected and proportional or incremental actuation of such brakes may be adopted when an aircraft braking operation is needed. The number of brakes to be used is not preselected but may be determined by the aircraft operation parameters at the particular time that the braking application is required. The number of selected brakes may be adjusted sequentially in accordance with one or more of the various parameters detailed above.

A suitable proximity means, for example as shown schematically in FIG. 6, may rotate to ensure that all necessary directions are scanned.

Suitable brake control systems for the above comprise electronic control boxes, microprocessors or dedicated landing gear computers, it being envisaged that in use of the cascade operating procedure on an aircraft, the operation of brakes may be controlled in relation to, and may be used in relation to the control or operation of, other aircraft systems and devices.

Because of the airworthiness implications of a systems failure i.e. that only some of the brakes operate during a landing operation, it is also contemplated within the scope of this invention to provide multiple discrimination means so that a measure of redundancy is built into the selective braking system.

The discrimination between landing and taxiing operations may be accomplished by means either contained within, or fitted externally to, the aircraft and which differentiate between the aircraft being airborne and having landed.

Said discrimination process may comprise means, as shown diagrammatically e.g. in FIG. 7, to identify that the aircraft is about to land or has already landed. Said means may be triggered for example by operation of the flying or flight surface controls in a sequence which is indicative of an imminent landing, by the deployment of air brakes or by the operation of the engine controls. Alternative means may respond to the results of operation of the said controls i.e. be triggered when the rate of descent falls below a threshold value, i.e. indicative of the aircraft touching down; this means may be triggered by one or more of the depicted wheel speed sensors when said speed rises above a threshold level indicative of wheel spin-up on touch down. Landing or imminent landing of the aircraft may be detected by a ground proximity warning/signaling device.

One or more of the triggering means recited in the preceding paragraph and shown in the attached drawings may be used in combination with a timing delay means of sufficient length to inhibit operation of the selective braking system during the delay period and thereby ensure that the aircraft has completed its landing run before the selective brake system is implemented.

In an alternative arrangement the triggering means could activate an aircraft speed sensing means which inhibits the operation of the selective brake operation means until the aircraft speed falls below a threshold value. In this case the selective braking function will commence operation at a fixed speed. The aircraft speed could be determined by measuring the aircraft wheel speed as is a standard practice in the industry.

Operation of the selective brake operation means may be inhibited if the anti-skid control system is active (i.e. dumping pressure to limit the brake actuation pressure) at any aircraft speed.

Triggering means as described above and illustrated herein may operate independently or in combination (thereby increasing overall reliability) and may additionally be used in combination with means of landing/taxi mode differentiation and selective brake operation inhibiting means of types known per se.

The operational status of the aircraft may be monitored by a pressure gauge mounted in or on the aircraft which measures the atmospheric pressure outside the aircraft. It may be provided that selective braking is only possible if the atmospheric pressure exceeds a threshold value; thus selective braking may be prevented while the aircraft is operating at airports/airfields at high altitude. This may be a particularly desirable additional safety feature.

Similarly the operational status of the aircraft may be monitored by a temperature measuring device which measures a temperature outside the aircraft and selective braking may be permitted only when the temperature is above a threshold level, e.g. 0° C.

Turning now to the drawings in greater detail, in FIG. 1 an aircraft wheel 42 and brake 44 fitted with temperature, wheel speed and brake wear sensors or transducers (50, 48 and 46 respectively) is connected to a hydraulic power supply and the brake pressure is controlled, via the electro-hydraulic valve 38, by the brake actuation controller 36. The brake actuation controller determines the number of brakes to be actuated from the plurality of brakes fitted to the aircraft. The controller 36 receives inputs from the airbrake status monitor 10 the thrust reverser status monitor 12, the airport data bank 14, the external environment monitor 16, the pilot's demand signalling device 24 the remote land-based signalling device 26 the operational safety controller 28, the flight spectrum stage discriminator 32, the anti-skid control system 34, the wheel speed transducer 48, the temperature sensor 50 and the wear sensor 46. The wheel speed transducer output is also connected to the anti-skid control system 34 and the landing/taxiing operation discriminator 30. The temperature output sensor 50 is also connected to the landing/taxiing operation discriminator 30 and the flight spectrum stage discriminator 32. The triggering devices output signal 22 is fed to the two discriminators 30, 32.

In practice the said functions 10–36 may be incorporated into a single computer.

Figures 2, 3:
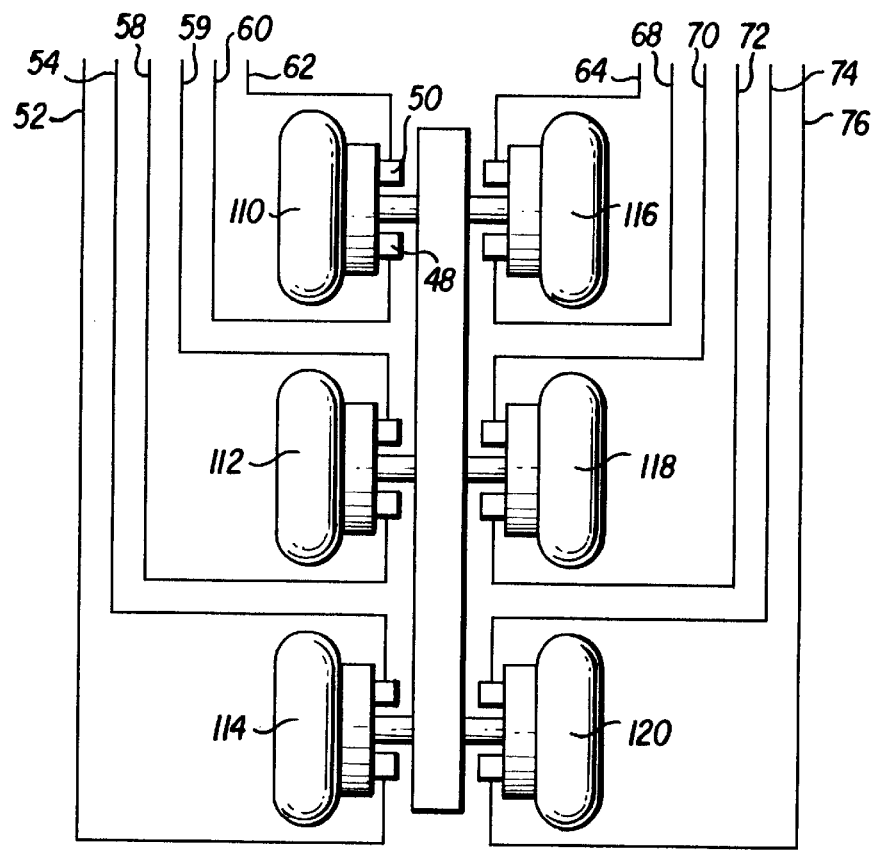
FIG. 2 is a diagrammatic plan view of a typical aircraft landing gear or truck that could be used in accordance with the invention.
FIG. 3 is a chart relating wheel speed and brake temperatures to different phases of a flight spectrum.

FIG. 2 shows a six wheel truck comprising wheels, 110, 112, 114, 116, 118 and 120, each of which provide input 52–76 to the brake actuation controller 36 from wheel speed transducers 48 and temperature sensors 50.

FIG. 3 shows schematically that on landing, wheel speed is high and the brake temperature rises as the aircraft decelerates so that in the taxi-in mode although the speed is low the brakes are hot. On taxi-out the brakes have cooled so both wheel speed and brake temperature are low and in a normal take-off the brake temperature remains low as the wheel speed increases to a maximum at lift off.

Figure 4:
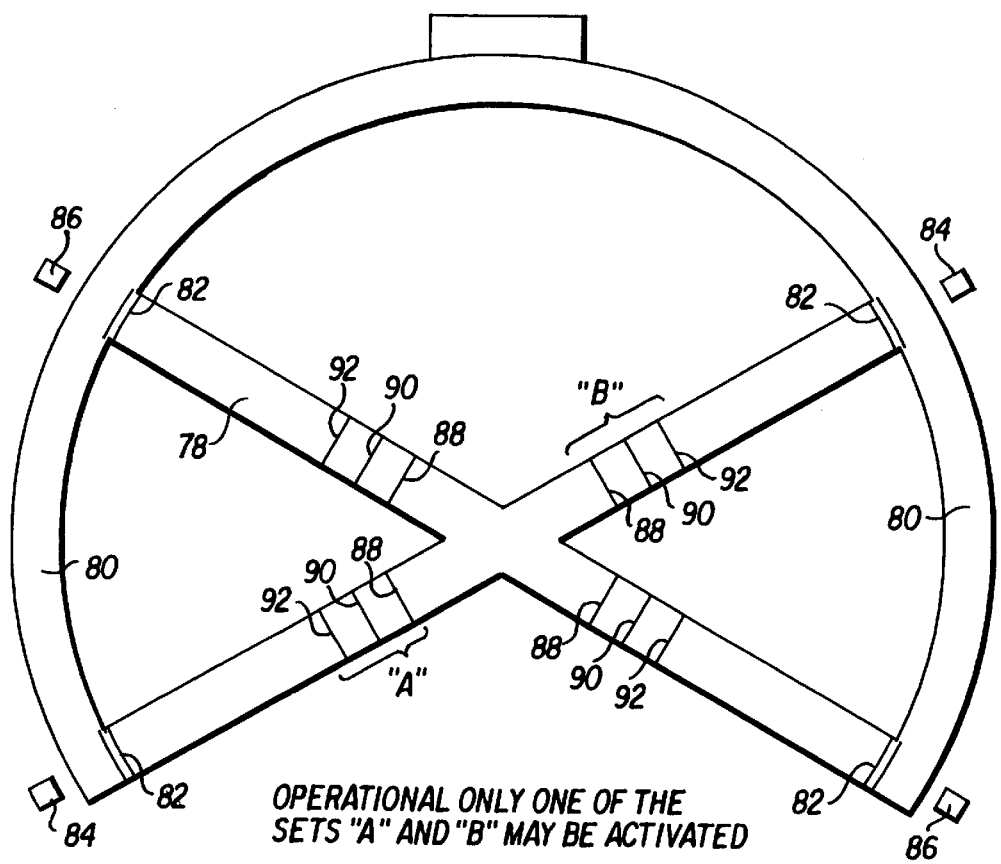
FIG. 4 is a schematic diagrammatic plan view of an airport.
Figure 5:
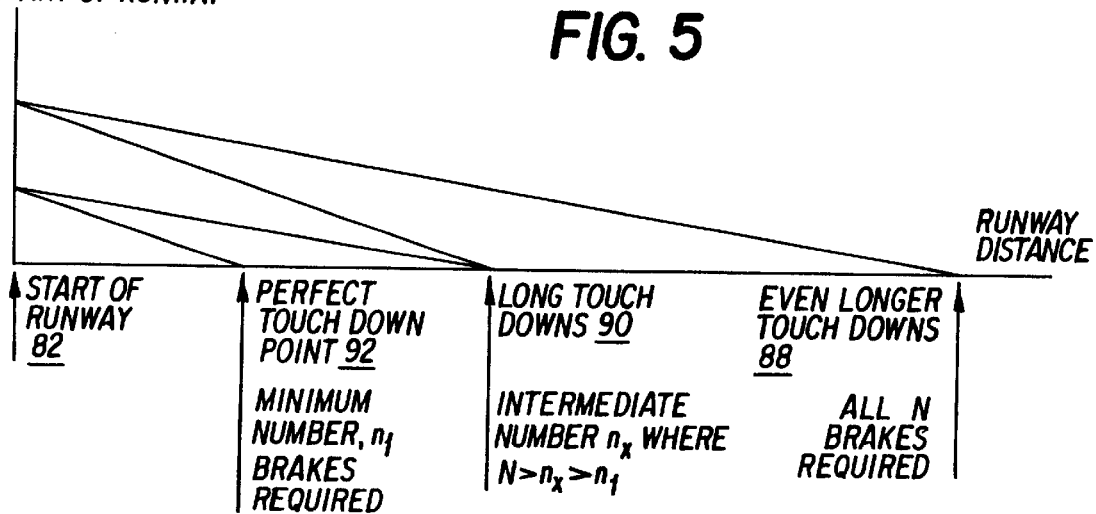
FIG. 5 is a diagrammatic side elevation showing aircraft final descent paths and the effect on the minimum number of brakes that should be activated on landing.

In FIG. 4, runways 77, 78 and taxi ways 80 are delineated by sensors 82 and the runways themselves are identified by location/signalling devices 84 and 86 which are unique to each runway. The runways are fitted with positioning devices 88, 90, 92 which signal the remaining runway length to the brake actuation controller 36. The sensors/devices 82–92 comprise the remote landing-based signaling means 26 of FIG. 1 and their function will now be described by reference to FIG. 5.

The devices 82 provide a positive means of identifying the transition from the landing-mode to the taxi-mode. The devices 88 are placed at the edge of the target touch down zone. If the aircraft overflies the target touch down zone, then a greater number of brakes need to be selected for braking during the landing run and if the aircraft successively overflies the further sensors 90 and 92 then all the brakes must be ready for use. If the aircraft touches down at the intermediate position then an intermediate number of brakes will be sufficient.

FIG. 6 shows an automatic operational safety controller 28 which receives signals from a proximity device 94, closing speed monitor 96, aircraft position location device 98, weight data recorder 100, airport data bank 14, and tire/ground friction monitors 102 and pre-processes the signals to provide the brake actuation controller a signal indicative of the minimum number of brakes that must be activated to provide a safe landing.

FIG. 7 shows a landing/taxiing operation discriminator which receives signals from a ground proximity device 104 a flying controls monitor 106 an airbrake deployment monitor 108 an engine control monitor 122 a rate of descent monitor 124 and one or more wheel speed transducers 48 and identifies whether the aircraft is operating in a landing as a taxiing mode and transmits an output signal to the brake actuation controller 36, indicative of whether the aircraft is in said landing or taxiing mode.

What I claim is:

1. An aircraft braking system comprising a plurality of carbon brakes, each brake having an associated actuating means for actuating the brakes in response to an applied control signal and control means, said control means being operable to limit the number of brakes that may be disabled at stages of a flight spectrum which includes taxi-out, take-off, landing and taxiing-in, said braking system further comprising an electronic database which stores information concerning characteristics of each of a plurality of potential aircraft landing locations, and selector means whereby in response to a setting of the selector means the database is operable selectively to define specified operating parameters of the control means whereby the number of disabled brakes is a function of monitored conditions applicable to an aircraft status at any given time thereby to ensure that the overall safety of the aircraft is not hazarded.

2. An aircraft braking system comprising a plurality of carbon brakes, each brake having an associated actuating means for actuating the brakes in response to an applied control signal and control means, said control means being operable to limit the number of brakes that may be disabled during the landing stage of a flight spectrum which includes taxi-out, take-off, landing and taxiing-in whereby the number of disabled brakes is a function of monitored conditions applicable to an aircraft status at any given time thereby to ensure that the overall safety of the aircraft is not hazarded, wherein the number of brakes that may be disabled is a function of at least one parameter of the aircraft external environment, and comprising automatic means for activating additional brakes in a selective braking operation in response to a signal related to at least one of said parameters.

3. An aircraft braking system comprising a plurality of carbon brakes, each brake having an associated actuating means for actuating the brakes in response to an applied control signal and control means, said control means being operable to limit the number of brakes that may be disabled at stages of a flight spectrum which includes taxi-out, take-off, landing and taxiing-in, said braking system further comprising proximity sensing means whereby operation of the control means is a function of a signal from said proximity means whereby the number of disabled brakes is a function of monitored conditions applicable to an aircraft status at any given time thereby to ensure that the overall safety of the aircraft is not hazarded.

4. An aircraft braking system comprising a plurality of carbon brakes, each brake having an associated actuating means for actuating the brakes in response to an applied control signal and control means, said control means being operable to limit the number of brakes that may be disabled at stages of a flight spectrum which includes taxi-out, take-off, landing and taxiing-in, the operation of which is controlled at least in part by an on-board brake control implementation means actuable by a remote land-based signalling means said system being operable to activate selective brake operating means in response to signaling means located between an aircraft runway and ancillary taxiways whereby the number of disabled brakes is a function of monitored conditions applicable to an aircraft status at any given time thereby to ensure that the overall safety of the aircraft is not hazarded.

5. An aircraft braking system comprising a plurality of carbon brakes, each brake having an associated actuating means for actuating the brakes in response to an applied control signal and control means, said control means being operable to limit the number of brakes that may be disabled at stages of a flight spectrum which includes taxi-out, take-off, landing and taxiing-in, the operation of which is controlled at least in part by an on-board brake control implementation means actuable by a remote land-based signalling means, wherein a manner of operation of the brake control implementation means is a function of whether the aircraft is operating within a designated runway area and comprising an auxiliary control system which comprises remote signalling means and a plurality of aircraft position location devices.

6. A method of operating brakes of a multi-wheel aircraft where the aircraft has a total of N brakes and a lesser number n of the brakes may be selectively operated said method comprising:

selectively operating the aircraft with the minimum number $n_1$ of brakes that are initially required to control the aircraft during the landing stage of a flight spectrum which includes taxi-out, take-off, landing and taxiing-in, detecting a condition which at least potentially requires braking force additional to that which can be provided by said $n_1$ brakes, applying additional braking force by increasing the number of brakes which are selectively operated from $n_1$ to $n_2$, detecting whether a condition requiring further additional braking force exists, and in response to a condition requiring further additional braking force, increasing the braking force progressively or incrementally by increasing the number of brakes which are selectively operated while said condition requiring said further additional braking force continues to exist.

7. The method according to claim 6 including operating the control means to limit a number and/or proportion of brakes disabled at a plurality of stages of a flight spectrum and also operating the control means such that the number and/or proportion of brakes operable during said phases may be further adjusted in response to conditions applicable to the aircraft status at a specified moment in time.

8. A method of controlling an aircraft braking system according to claim 6 in which the control means operates for inhibiting brakes during the take-off stage of said flight spectrum.

9. A method of controlling an aircraft braking system comprising a plurality of carbon disc brakes, said method comprising providing brake actuating means for actuating the brakes in response to an applied control signal, providing control means for inhibiting any one of a plurality of different numbers of the brakes during the landing stage of a flight spectrum which includes taxi-out, take-off, landing, and taxiing-in and arranging the control means to be responsive to a braking level requirement of the aircraft to inhibit a number of brakes selected as a function of said braking level requirement wherein the minimum number of brakes is selected and actuated consistent with controlling the aircraft in a safe manner in accordance with the instantaneous braking requirement of the aircraft.

10. The method according to claim 9 and comprising monitoring for anti-skid activity and increasing the number of operational brakes progressively or incrementally in the event of anti-skid activity until the anti-skid activity ceases or decreases to below a preselected threshold on a designated number of active brakes.

11. The method in accordance with claim 9 and comprising monitoring parameters on which the onset of a skid condition is known to depend and arranged that when the onset of a skid condition is predicted or while the occurrence of a skid condition continues the number of operational brakes progressively or incrementally increases.

12. A method of controlling an aircraft braking system according to claim 9 in which the control means operates for inhibiting brakes during the take-off stage of said flight spectrum.

13. An aircraft braking system comprising a plurality of carbon brakes, each brake having an associated actuation means for selectively actuating the brakes and control means operable during the landing stage of a flight spectrum which includes taxi-out, take-off, landing and taxiing-in for automatically activating additional brakes in a selective braking operation in response to at least one signal indicative of an instantaneous braking level requirement, said control means being adapted to select and to actuate a number of the brakes as a function of said instantaneous braking level requirement as necessary to control the aircraft in a safe manner.

14. An aircraft braking system according to claim 13 in which the control means is operable to limit the number of brakes that may be disabled during the take-off stage of said flight spectrum.

15. An aircraft braking system according to claim 13 wherein the control means operates incrementally whereby, as the control signal applied to the brake actuating means changes, the number of brakes which are inhibited changes incrementally one brake at a time.

16. An aircraft braking system according to claim 13 wherein the control system operates incrementally whereby as a control signal applied to the brake actuating means changes, the number of brakes which are inhibited changes incrementally two brakes at a time.

17. An aircraft braking system according to claim 16 wherein said two brakes lie respectively at right and left-hand sides of a longitudinal, fore-and-aft center line of the aircraft.

18. An aircraft braking system in accordance with claim 13 including means to apply different brake actuation pressures to different brakes.

19. An aircraft braking system in accordance with claim 18 and arranged such that as additional brakes are brought into operation sequentially, different brake actuation pressures are applied to the additional brakes in a manner selected to raise the temperature of the additional brakes as quickly as practical to the temperature of prior operating brakes.

20. An aircraft braking system comprising a plurality of carbon brakes, each brake having an associated actuation means for selectively actuating the brakes and control means operable during the landing stage of a flight spectrum which includes taxi-out, take-off, landing and taxiing-in for automatically activating additional brakes in a selective braking operation in response to at least one signal indicative of an instantaneous braking level requirement, the operation of said control means being at least in part controlled by an on-board brake control implementation means actuable by a remote land-based signalling means, said control means being adapted to select and to actuate a number of the brakes as a function of said instantaneous braking level requirement as necessary to control the aircraft in a safe manner.

21. An aircraft braking system according to claim 20 in which the control means is operable to limit the number of brakes that may be disabled during the take-off stage of said flight spectrum.

22. An aircraft braking system comprising a plurality of carbon brakes, each brake having an associated actuation means for selectively actuating the brakes, the selective brake actuating means being responsive at least in part to a signalling means indicative of the aircraft being within a designated runway area and control means for automatically activating additional brakes in a selective braking operation in response to at least one signal indicative of an instantaneous braking level requirement, the operation of said control means being at least in part controlled by an on-board brake control implementation means actuable by a remote land-based signalling means, said control means being adapted to select and to actuate a number of the brakes as a function of said instantaneous braking level requirement as necessary to control the aircraft in a safe manner.

23. An aircraft braking system comprising
- a plurality of carbon brakes, each brake having an associated actuating means for actuating the brake in response to an applied control signal,
- an electronic database for storing information concerning characteristics of each of a plurality of potential aircraft landing locations,
- selector means to select data relating to an individual landing location from the said information,
- control means operable to limit a number of brakes that may be disabled at stages of a flight spectrum including taxi-out, take-off, landing and taxiing-in whereby the number of disabled brakes is a function of monitored conditions applicable to an aircraft status at any given time, and of specified operating parameters of the control means defined by said data selected from the electronic database in response to a setting of the selector means thereby to ensure that the overall safety of the aircraft is not compromised.

24. An aircraft braking system comprising a plurality of carbon brakes, each brake having an associated actuating means for actuating the brake in response to an applied control signal, control means, said control means being operable to limit the number of brakes that may be disabled during the landing stage of a flight spectrum including taxi-out, take-off, landing and taxiing-in whereby the number of disabled brakes is a function of monitored conditions applicable to an aircraft status at any given time, said conditions including at least one parameter of the aircraft external environment selected from the group consisting of proximity of other vehicles, relative velocity of other vehicles or objects in relation to a subject aircraft, tire-ground friction coefficient, location of the aircraft relative to predetermined zones of an airport, and external signaling means thereby to ensure that the overall safety of the aircraft is not compromised.

25. An aircraft braking system according to claim 24 in which the control means is operable to limit the number of brakes that may be disabled during the take-off stage of said flight spectrum.

26. An aircraft braking system comprising a plurality of carbon brakes, each brake having an associated actuating means for actuating the brake in response to an applied control signal, an electronic database for storing information concerning characteristics of each of a plurality of potential aircraft landing locations, selector means to select data relating to an individual landing location from the said information, control means operable to limit the number of brakes that may be disabled at stages of a flight spectrum including taxi-out, take-off, landing and taxiing-in, whereby the number of disabled brakes is a function of monitored conditions applicable to an aircraft status at any given time, said conditions including at least one parameter of the aircraft external environment selected from the group consisting of proximity of other vehicles, relative velocity of other vehicles or objects in relation to a subject aircraft, tire-ground friction coefficient, and location of the aircraft relative to predetermined zones of an airport, and specified operating parameters of the control means defined by said data selected from the electronic database in response to a setting of the selector means, thereby to ensure that the overall safety of the aircraft is not compromised at an individual landing location.

27. An aircraft braking system comprising a plurality of carbon brakes, each brake having an associated actuating means for actuating the brake in response to an applied control signal, control means operable to limit the number of brakes that may be disabled during the landing stage of a flight spectrum including taxi-out, take-off, landing and taxiing-in whereby the number of disabled brakes is a function of monitored conditions applicable to an aircraft status at any given time, said conditions including at least one parameter characteristic of the aircraft or its operation selected from the group consisting of aircraft velocity, wheel velocity, aircraft all up weight, and degree of wear of brake disc assemblies such that a minimum number of brakes which satisfies the instantaneous braking level requirement is applied thereby to ensure that the overall safety of the aircraft is not compromised.

28. An aircraft braking system according to claim 27 in which the control means is operable to limit the number of brakes that may be disabled during the take-off stage of said flight spectrum.

29. An aircraft braking system comprising a plurality of carbon brakes, each brake having an associated actuating means for actuating the brake in response to an applied control signal, an electronic database for storing information concerning characteristics of each of a plurality of potential aircraft landing locations, selector means to select data relating to an individual landing location from the said information, control means operable to limit the number of brakes that may be disabled during the landing stage of a flight spectrum including taxi-out, take-off, landing and taxiing-in, whereby the number of disabled brakes is a function of monitored conditions applicable to an aircraft status at any given time, said conditions including at least one parameter characteristic of the aircraft or its operation selected from the group consisting of aircraft velocity, wheel velocity, aircraft all up weight, and degree of wear of brake disc assemblies and at least one parameter of the aircraft external environment selected from the group consisting of proximity of other vehicles, relative velocity of other vehicles or objects in relation to a subject aircraft, tire-ground friction coefficient, and location of a subject aircraft relative to predetermined zones of an airport, and specified operating parameters of the control means defined by said data selected from the electronic database in response to a setting of the selector means, such that the minimum number of brakes which satisfies the instantaneous braking level requirement is applied, thereby to ensure that the overall safety of the aircraft is not compromised.

30. An aircraft braking system according to claim 29 in which the control means is operable to limit the number of brakes that may be disabled during the take-off stage of said flight spectrum.

31. An aircraft braking system comprising a plurality of carbon brakes, each brake having an associated actuating means for actuating the brake in response to an applied control signal, measuring means to determine the remaining allowable wear in the brake, an electronic database for storing information concerning characteristics of each of a plurality of potential aircraft landing locations, selector means to select data relating to an individual landing location from said information, a plurality of status monitors to determine parameters related to the external environment of an aircraft, control means being operable to limit the number of brakes that may be disabled, to actuate the minimum number of brakes which satisfies the instantaneous braking level requirement, to identify the individual brakes that are to be disabled, and to activate additional brakes in a selective braking operation in response to a signal indicative of an increased instantaneous braking level requirement, at stages of a flight spectrum including taxi-out, take-off, landing and taxiing-in, whereby the number of disabled brakes is a function of each of a set of monitored parameters applicable to an aircraft status at any given time, said set comprising each of a first sub-set of parameters relating to the aircraft external environment and each of a second sub-set of parameters relating to the characteristics of the aircraft and its operation, said first sub-set being the proximity of other vehicles, the relative velocity of other vehicles or objects in relation to the subject aircraft, tire-ground friction coefficient, and location of an aircraft relative to predetermined zones of an airport, and said second sub-set being the aircraft velocity, wheel velocity, aircraft all up weight, and degree of wear of brake disc assemblies and of specified operating parameters of the control means defined by said data selected from the electronic database in response to a setting of the selector means, thereby to ensure that the overall safety of the aircraft is not compromised.

32. An aircraft braking system comprising a plurality of carbon brakes, each brake having an associated actuating means for actuating the brake in response to an applied control signal; control means operable to limit the number of brakes that may be disabled at stages of a flight spectrum including taxi-out, take-off, landing and taxiing-in and to activate additional brakes in response to an increased instantaneous braking level requirement and to apply different brake actuation pressures to different brakes such that as additional brakes are brought into operation sequentially, different brake actuation pressures are applied to the additional brakes in a manner selected to raise the temperature of the additional brakes as quickly as practical to the temperature of prior operating brakes such that the number of brakes which is actuated is the minimum number which satisfies the instantaneous braking level requirement thereby to ensure that the overall safety of the aircraft is not compromised.

33. An aircraft braking system comprising a plurality of carbon brakes, each brake having an associated actuating means for actuating the brake in response to an applied control signal and having measuring means to determine the remaining allowable wear in the brake, an electronic database for storing information concerning characteristics of each of a plurality of potential aircraft landing locations, a first selector means to identify data relating to an individual landing location from the said information, sensor means located between an aircraft runway and ancillary taxiways, remote signaling means transmitting signals received from said sensor means indicative of an aircraft being within a designated runway area, an aircraft speed measuring device, an aircraft wheel speed measuring device, an aircraft all up weight measuring device, a plurality of status monitors to determine parameters related to the external environment of the aircraft, control means operable to limit the number of brakes that may be disabled, and to actuate the minimum number of brakes which satisfies the instantaneous braking level requirement, at stages of a flight spectrum including taxi-out, take-off, landing and taxiing-in, said control means comprising a second selector means to identify the individual brakes that are to be operational;

an automatic means for activating additional brakes in a selective braking operation in response to a signal related to at least one of said parameters indicative of an increased instantaneous braking level requirement and having means to apply different brake actuation pressures to different brakes such that as additional brakes are brought into operation sequentially, different brake actuation pressures are applied to the additional brakes in a manner selected to raise the temperature of the additional brakes as quickly as practical to the temperature of prior operating brakes such that the minimum number of brakes which satisfies the instantaneous braking level requirement is actuated whereby the number of disabled brakes is a function of monitored conditions applicable to an aircraft status at any given time, said conditions including at least one parameter of the aircraft external environment selected from the group consisting of the proximity of other vehicles, the relative velocity of other vehicles or objects in relation to a subject aircraft, tire-ground friction coefficient, location of the aircraft relative to predetermined zones of an airport, and at least one parameter relating to a characteristic of the aircraft and its operation selected from the group consisting of aircraft velocity, wheel velocity, aircraft all up weight, and degree of wear of brake disc assemblies and specified operating parameters of the control means defined by said data selected from the electronic database in response to a setting of the first selector means, thereby to ensure that the overall safety of the aircraft is not compromised at an individual landing location.

34. An aircraft braking system comprising a plurality of carbon brakes, each brake having an associated actuating means for actuating the brake in response to an applied control signal and having measuring means to determine the remaining allowable wear in the brake, an electronic database which stores information concerning characteristics of each of a plurality of potential aircraft landing locations, a first selector means to identify data relating to an individual landing location from the said information, sensor means located between an aircraft runway and ancillary taxiways, remote signaling means transmitting signals recalled from said sensor means indicative of an aircraft being within a designated runway area, an aircraft speed measuring device, an aircraft wheel speed measuring device, an aircraft all up weight measuring device, a plurality of status monitors to determine parameters related to the external environment of the aircraft, a plurality of location devices to define a plurality of positions along an airport runway, an aircraft-mounted flight spectrum stage discriminator and control means operable to limit the number of brakes that may be disabled, and to actuate the minimum number of brakes which satisfies an instantaneous braking level requirement, at stages of a flight spectrum including taxi-out, take-off, landing and taxiing-in, said control means comprising a second selector means to identify the individual brakes that are to be operational, an automatic means for activating additional brakes in a selective braking operation in response to a signal related to at least one of said parameters indicative of an increased instantaneous braking level requirement and having means to apply different brake actuation pressures to different brakes such that as additional brakes are brought into operation sequentially, different brake actuation pressures are applied to the additional brakes in a manner selected to raise the temperature of the additional brakes as quickly as practical to a temperature of prior operating brakes such that a minimum number of brakes which satisfies an instantaneous braking level requirement is actuated, and being provided in the form of an electronic control box, a microprocessor control device or as part of a landing gear computer, whereby the number of disabled brakes is a function of each of a set of monitored parameters applicable to an aircraft status at any given time, said set comprising each of a first sub-set of parameters relating to a subject aircraft external environment and each of a second sub-set of parameters relating to characteristics of the subject aircraft and its operation said first sub-set being the proximity of other vehicles, the relative velocity of other vehicles or objects in relation to the subject aircraft, the tire-ground friction coefficient, and location of the subject aircraft relative to predetermined zones of an airport, and said second sub-set being the aircraft velocity, wheel velocity, aircraft all up weight, and degree of wear of brake disc assemblies and specified operating parameters of the control means defined by said data selected from the electronic database in response to a setting of the first selector means, such that the number of brakes to be disabled during a landing run may be determined in part by the approach rate of an aircraft prior to touch down and the remaining length of the runway immediately following touch down thereby to ensure that the overall safety of the aircraft is not compromised at an individual landing location.

35. A method of controlling an aircraft braking system comprising a plurality of carbon disc brakes, said method comprising actuating the brakes in response to an applied control signal, providing control means for inhibiting any one of a plurality of different numbers of the brakes and monitoring for anti-skid activity during the landing stage of a flight spectrum which includes taxi-out, take-off, landing and taxiing-in, arranging the control means to be responsive to a braking level requirement of a subject aircraft to inhibit a number of brakes selected as a function of said braking level requirement wherein the minimum number of brakes is selected and actuated consistent with controlling the aircraft in a safe manner in accordance with an instantaneous braking requirement of the aircraft and increasing a number of operational brakes progressively or incrementally in the event of anti-skid activity until the anti-skid activity ceases or decreases to below a preselected threshold on said minimum number of active brakes.

36. An aircraft braking system according to claim 35 in which the control means is operable to limit the number of brakes that may be disabled during the take-off stage of said flight spectrum.

37. A method of operating brakes of a multi-wheel aircraft during landing and taxiing thereof where the aircraft has a total of N brakes and wherein a lesser number of the brakes $n_x, \ldots n_2, n_1$ may be selectively operated and $N > n_x > n_2 > n_1$ said method comprising selectively operating the aircraft with a minimum number $n_1$ of brakes that are initially required to control the aircraft in a safe manner, during stages of a flight spectrum, including taxi-out, take-off, landing and taxiing-in, detecting a condition which at least potentially requires the use of additional braking force beyond that which can be provided by $n_1$ brakes, applying said additional braking force progressively or incrementally by increasing a number of brakes which are selectively operated from $n_1$ to $n_2$, detecting whether a condition requiring additional braking force continues to exist, and increasing the braking force progressively or incrementally by increasing the number of brakes which are selectively operated from $n_2$ to $n_x$ while said condition requiring additional braking force continues to exist.

38. The method according to claim 9 and comprising monitoring conditions on which a requirement for increased braking force is known to depend and in the event of detecting a potential requirement for increased braking force arranging that said control means brings into operation only a limited number of the brakes the operation of which has been inhibited.

* * * * *